United States Patent [19]
Grundvig et al.

[11] Patent Number: 6,122,502
[45] Date of Patent: Sep. 19, 2000

[54] ROAMING CORDLESS TELEPHONE

[75] Inventors: Jeffrey Paul Grundvig, Macungie; John P. Veschi, Fogelsville, both of Pa.

[73] Assignee: Lucent Technologies Inc., Murray Hill, N.J.

[21] Appl. No.: 08/996,582

[22] Filed: Dec. 23, 1997

[51] Int. Cl.⁷ .............................. H04Q 7/20; H04Q 7/24; H04Q 7/38
[52] U.S. Cl. ...................... 455/414; 455/462; 455/433; 455/435; 455/550; 455/554; 455/555; 455/517
[58] Field of Search .................................... 455/414, 403, 455/462, 463, 445, 432, 433, 435, 422, 550, 561, 552, 554, 555, 560, 517

[56] References Cited

U.S. PATENT DOCUMENTS

| | | | |
|---|---|---|---|
| 4,768,218 | 8/1988 | Yorita | 455/445 |
| 5,367,558 | 11/1994 | Gillig et al. | 455/414 |
| 5,805,999 | 9/1998 | Inoue | 455/462 |
| 5,832,378 | 11/1998 | Zicker et al. | 455/414 |
| 5,842,122 | 11/1998 | Schellinger et al. | 455/462 |
| 5,901,357 | 5/1999 | D'Avello et al. | 455/414 |

OTHER PUBLICATIONS

Patent No. 5,550,895, filed on Dec. 2, 1993 and issued on Aug. 27, 1996 to Burson et al.. Class: 379/59.

*Primary Examiner*—Fan Tsang
*Assistant Examiner*—Keith Ferguson
*Attorney, Agent, or Firm*—John P. Veschi

[57] ABSTRACT

A cordless telephone base unit includes a registration unit adapted to selectively register with a handset according to at least one predefined criterion, a call handling unit adapted to handle an incoming call when the handset is registered with the registration unit, and a call forwarding unit adapted to forward an incoming call to a forwarding number when the handset is not registered with the registration unit.

29 Claims, 2 Drawing Sheets

ROAMING CORDLESS TELEPHONE

FIELD OF THE INVENTION

This invention is directed to the field of telephony, and more particularly to the field of cordless telephony.

BACKGROUND OF THE INVENTION

A conventional cordless telephone comprises a handset and a corresponding base unit. The base unit is typically physically coupled to a telephone line, and thus to a public switched telephone network (PSTN), via a telephone line interface (TLI). The handset and base unit communicate via a link, such as an RF link. Thus, as long as a user holding the handset is within range of the base unit, the user can engage in telephone conversations over the PSTN. Generally, there is a one-to-one correspondence between base units and handsets. Thus, if a user has multiple cordless telephones, the user has multiple handsets. For example, a user may have a first cordless telephone at a home location, and a second cordless telephone at a work location. Further, if a user has many work locations or is otherwise very mobile, the user may have additional cordless telephones at additional locations. A caller attempting to contact the user must be knowledgeable of the individual telephone numbers corresponding to each location.

Some or all of these cordless telephones may be shared resources, such that in each case the user does not in fact have full control of the resource. If a user of a shared cordless telephone has the handset of the shared cordless telephone in the user's possession, then other users are unable to use the shared cordless telephone, even if the user with possession of the handset is not presently engaged in telephony activity.

SUMMARY OF THE INVENTION

A cordless telephone architecture according to the invention allows a cordless telephone user to use the same cordless telephone handset with multiple cordless telephone base units. An incoming caller needs to know only one of the user's telephone numbers, such as the user's home telephone number, and the multiple base units will properly route the incoming call to the cordless telephone base unit in proximity to the cordless telephone handset. Accordingly, a cordless telephone base unit according to the invention includes a registration unit adapted to selectively register with a handset according to at least one predefined criterion, a call handling unit adapted to handle an incoming call when a handset is registered with the registration unit, and a call forwarding unit adapted to forward an incoming call to a forwarding number when no handsets are registered with the registration unit.

DETAILED DESCRIPTION

Figure 1:
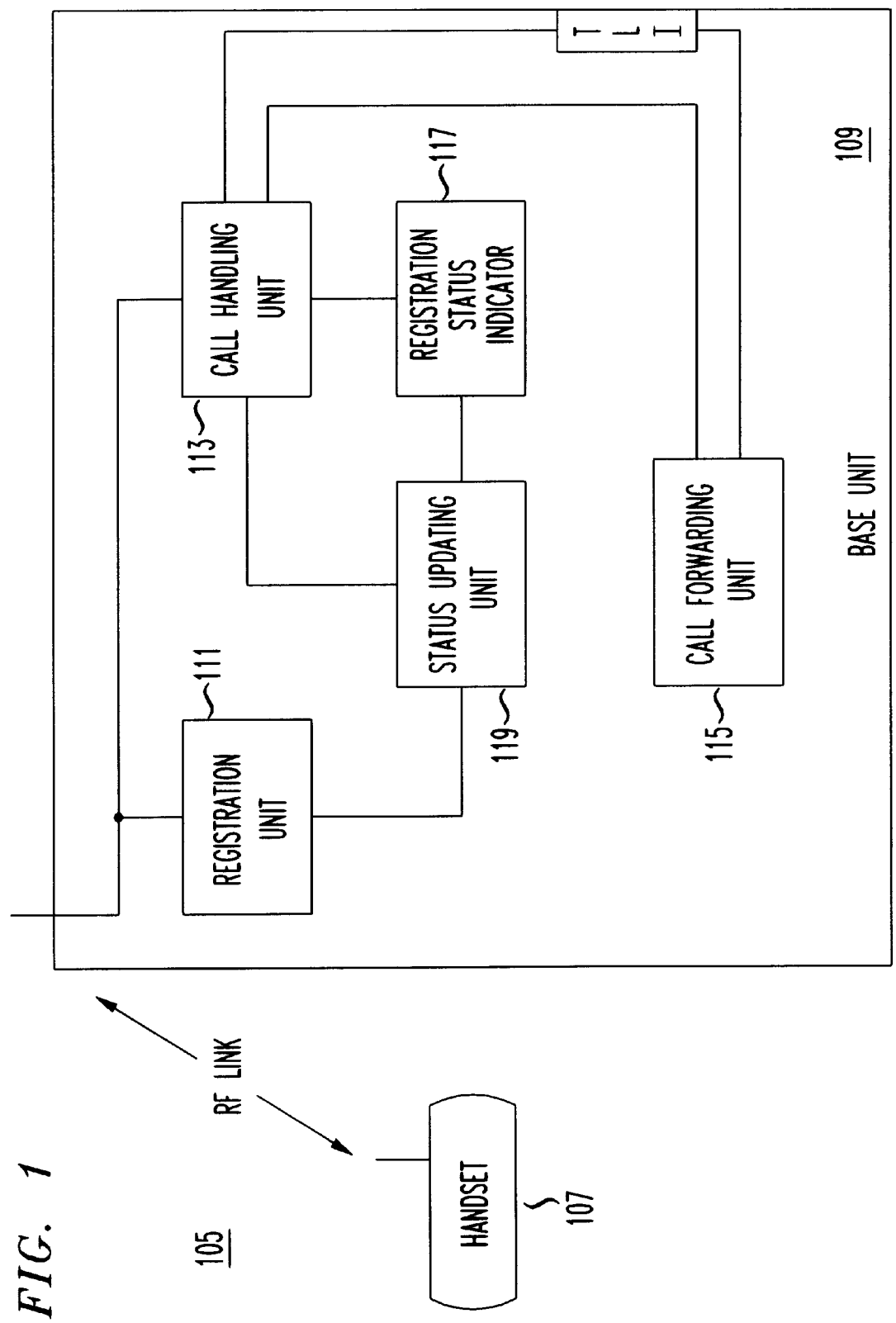
FIG. 1 is a simplified block diagram of one embodiment of a cordless telephone according to the invention.

FIG. 1 is a simplified block diagram of a cordless telephone 105 according to the invention. Cordless telephone 105 includes two subsystems: a cordless telephone handset 107 and a cordless telephone base unit 109. Cordless telephone base unit 109 includes a registration unit 111, a call handling unit 113 and a call forwarding unit 115. The registration unit 111 is adapted to selectively register with a handset, such as handset 107, based on at least one predefined criterion, such as proximity to the base unit 109. The call handling unit 113 is adapted to handle an incoming call when a handset is registered with the registration unit 111. The call forwarding unit 115 is adapted to forward an incoming call to a forwarding number when the handset is not registered with registration unit 111.

Registration unit 111, call handling unit 113 and call forwarding unit 115 may be realized as part of a processor, such as a digital signal processor (DSP). Such a DSP may also be configured to control base unit 109 to perform conventional functions in addition to the functions described herein with respect to the invention.

Base unit 109 may also include a registration status indicator 117 and a status updating unit 119, which may be realized separate from the aforementioned components, or may be realized as part of the same processor as the aforementioned components. The registration status indicator 117 maintains an indication of a registration status for individual handsets, such as handset 107. The status information includes, for example, an identification of a base unit, if any, with which the handset 107 is registered. The registration unit 111 and the status updating unit 119 update the registration status indicator when there is a change in registration status.

According to the invention, a user can have multiple base units 109 positioned, for example, at multiple locations, and each capable of communicating with handset 107 via an RF link when handset 107 is in range of and registered with the base unit 109. For example, a user may have a first base unit 109h at a home location, and a second base unit 109w at a work location. The base units 109 communicate with each other via the PSTN to inform each other of the registration status of handset 107.

For example, according to the invention, a user may take the handset 107 with her when she leaves home, and may then register the handset with a base unit 109w at her office when she arrives for work. The home base unit 109h, when not in proximity to the handset, responds to an incoming call in various ways. For example, it may act as an answering machine according to conventional answering machine functionality contained therein to store a message from an incoming caller, or it may forward the call to the work base unit 109w (and hence to the handset 107) if the handset 107 has been registered with the work base unit 109w.

The process to accomplish the aforementioned call forwarding method can include the feature of the work base unit 109w communicating with the home base unit 109h to let the home base unit 109h know when the handset 107 is registered with the work base unit 109w and when the handset is out-of-range/unregistered with the work base unit 109w. The handset 107 may optionally be a dual mode handset, such that it is able to operate as a cellular phone to receive forwarded calls when the handset 107 is not registered with either the home or work base units 109w. Such dual mode functionality is described, for example, in U.S. Pat. No. 5,550,895, issued to Burson et. al., and incorporated herein by reference.

The example provided above assumes a simplistic model comprising two locations. A greater number of work and home locations can be accommodated as long as each location has a base unit 109, and preferably, as long as the base units 109 have the ability to communicate amongst themselves so that each base unit 109 knows which, if any, of the base units 109 is the currently registered base unit for forwarding purposes.

Figure 2:
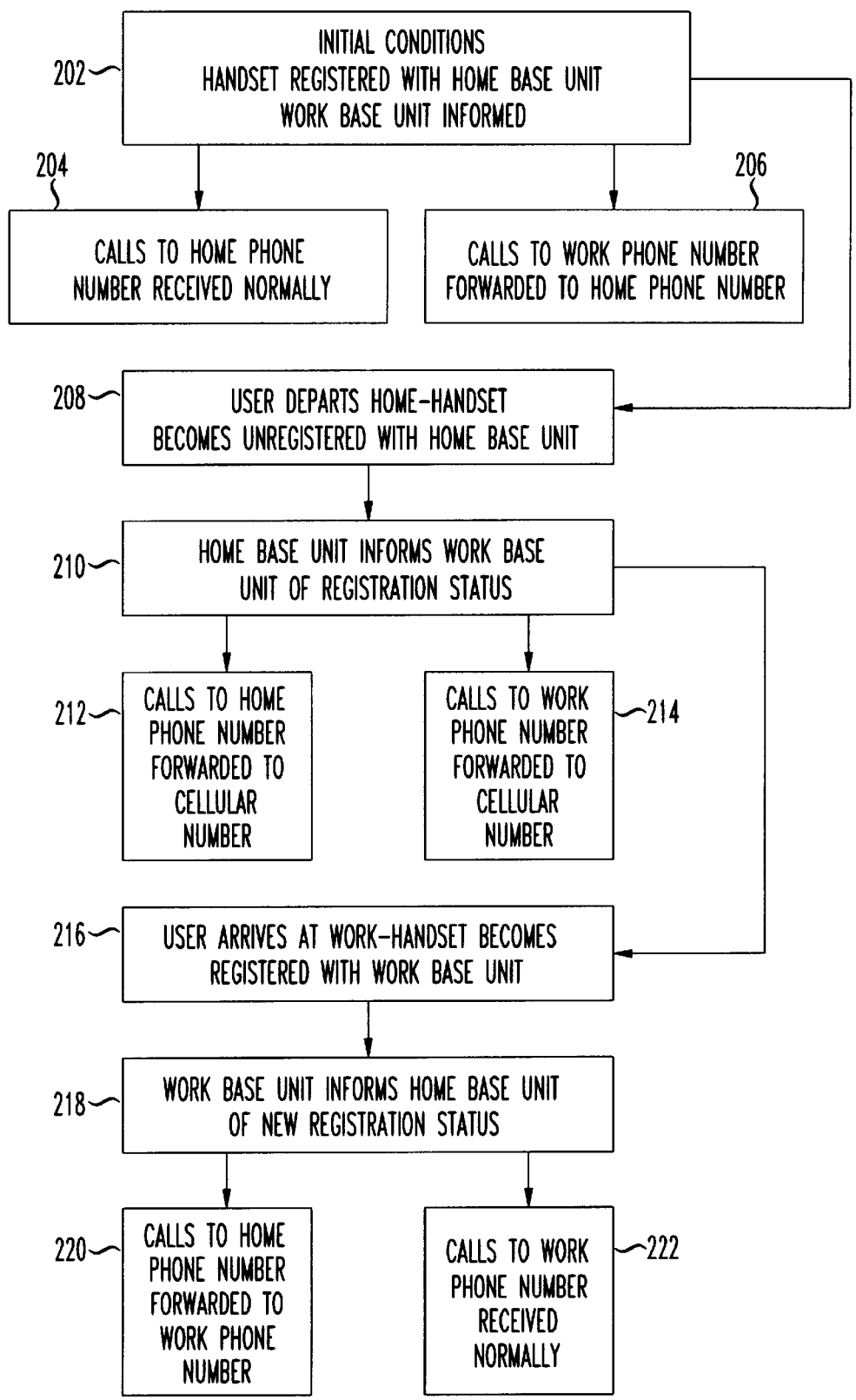
FIG. 2 is a flowchart showing an exemplary process of implementing the invention with multiple base units.

FIG. 2 provides a flowchart showing an example of the roaming procedure. Step 202 shows an initial condition wherein handset 107 is initially registered with the user's home base unit 109h. The home base unit 109h has informed the work base unit 109w that the handset is registered with the home base unit 109h by placing a call to the work base unit 109w at the time the handset became registered with the home base unit 109h. The home base unit 109h is associated with a home telephone number, and the work base unit 109w is associated with a work telephone number.

At step 204, an incoming telephone call to the home telephone number is received by the home base unit 109h and processed in a conventional manner after home base unit 109h determines that handset 107 is registered therewith. For example, the incoming telephone call is received by call handling unit 113 of home base unit 109h via the telephone line interface (TLI). Call handling unit 113 checks with the registration status indicator 117 to determine the registration status of handset 107, and based on the status of handset 107 as being locally registered, call handling unit 113 processes the call in a conventional manner, enabling communications over the RF link between handset 107 and base unit 109h.

At step 206, an incoming call to the work telephone number is received by the work base unit 109w and automatically forwarded to the home telephone number. As the call is being received, the call handling unit 113 of work base unit 109w checks with the registration status indicator 117 to see if handset 107 is registered therewith. Upon learning that handset 107 is registered with home base unit 109h, call handling unit 113 informs call forwarding unit 115 to cause call forwarding unit 115 to forward the incoming call to the home telephone number.

At step 208, the user departs home and brings handset 107 with her. The handset 107 transitions into an unregistered status at this point, and registration status indicator 117 is updated by status updating unit 119 based on this transition. The transition to unregistered status can occur according to user instruction, such as the user manipulating a button on handset 107 or base unit 109h to inform status updating unit 119 of the change (or impending change) in registration status. Alternatively, the transition to unregistered status can occur automatically. For example, home base unit 109h, while registered with handset 107, can periodically poll handset 107 to determine if handset 107 is within range of home base unit 109h and should therefore continue to be registered therewith. An example of such polling is for registration unit 111 of home base unit 109h to communicate with handset 107 via the RF link and to measure the signal strength of received signals to create a Received Signal Strength Indication (RSSI). It is known to one of skill in the art to use RSSI as a measure of proximity between two communicating devices. Based on the RSSI, registration unit 111 informs status updating unit 119 of the change in status, and status updating unit 119 updates the registration status indicator 117.

Preferably, the RSSI will be associated with a uniquely identifiable signal. Thus, for example, the polling conducted by registration unit 111 can comprise periodic interrogation of a plurality of potentially registered handsets. Registration unit 111 can then analyze any received signals, identify the source of each received signal by, for example, decoding source identifying information contained therein, and measure the signal strength of the received signals to determine if any handsets are proximate to, and should therefore be registered with, registration unit 111.

At step 210, status updating unit 119 of home base unit 109h informs work base unit 109w of the transition in status by placing a call via the PSTN. Call handling unit 113 of work base unit 109w recognizes the incoming call as an updating call by, for example, recognizing a predetermined dual tone multifrequency (DTMF) sequence corresponding to updating calls and positioned for example in a header portion of the updating call. Call handling unit 113 of work base unit 109w thus informs status updating 119 of the change in status, and status updating unit 119 updates the registration status indicator 117 accordingly. Thus, in both the home base unit 109h and the work base unit 109w, the registration status indicator 117 reflects that the handset 107 is no longer registered with the home base unit 109h.

According to one embodiment of the invention, when handset 107 is in an unregistered status, incoming calls to the home and work phone numbers are handled via conventional telephone answering machine functionality, wherein the incoming caller is offered the option to store a message. Alternatively, call handling unit 113 can determine that incoming calls are to be forwarded, and as shown at steps 212 and 214, the call forwarding unit 115 of each of base units 109h and 109w can forward incoming calls to a cellular telephone number corresponding to handset 107. Thus, while handset 107 is not registered with any base unit 109, handset 107 can operate in a cellular mode and continue to receive incoming calls.

Call handling unit 113 can act in a discriminating manner, selectively allowing incoming calls to be forwarded. For example, call handling unit 113 can be programmed to analyze call related information, such as Caller ID data, associated with the incoming calls, and only forward incoming calls from specific pre-approved callers. Thus, the user does not incur cellular phone charges for every incoming caller.

At step 216, the user arrives at her work location and handset 107 becomes registered with work base unit 109w. Registration may occur according to user instruction. Alternatively, registration may be automatic. For example, while handset 107 is unregistered, registration unit 111 of work base unit 109w can periodically poll for handset 107 and measure the RSSI of any signal determined to be from handset 107. When the measured RSSI meets or exceeds a predetermined threshold, registration unit 111 informs status updating unit 19, which updates registration status indicator 117 accordingly. At step 218, status updating unit 119 also initiates an updating call to home base unit 109h, via the PSTN, to update its registration status indicator 117 via its call handling unit 113 and status updating unit 119. Thus, as a result of step 218, the registration status indicator 117 of each base unit 109h and 109w reflects the registration of handset 107 with work base unit 109w.

At step 220, calls to home base unit 109h are now forwarded via call handling unit 113 and call forwarding unit 115 to the home base unit 109w, and at step 222 calls to the home base unit 109w are received normally. This status continues until handset 107 becomes unregistered with work base unit 109w.

As a modification to the above scenario, in order to save on the costs associated with receiving cellular calls, a user can select to have the handset 107 act as a pager when not registered with any base unit, thus receiving a paging message instead of a cellular phone call at steps 212 and 214. Based on the paging message, the user can then decide to initiate a cellular call to the party issuing the page (perhaps by merely pressing a button directing the handset to enter cellular mode and place a call to the party originating the page), or to wait until registered with a base unit in order to respond via a cordless telephone call.

The invention is described above with respect to a simplified scenario involving one handset 107 and two base units 109h and 109w. Of course, any number of handsets 107 and base units 109 can be employed, with the registration status indicator 117 of each base unit reflecting the status of each handset 107 according to the principles of the invention.

Further, the mode of communication between base units described above is purely by way of example. Instead of communicating over the PSTN, multiple base units within a campus setting can communicate via a Private Branch Exchange (PBX). Alternatively, base units can be configured to communicate with each other via the internet. Similarly, the incoming and forwarded calls may be received and transmitted over the internet or any other communications medium.

What is claimed is:

1. A cordless telephone base unit, comprising:
   a registration unit adapted to selectively register with a handset according to at least one predefined criterion;
   a call handling unit adapted to handle an incoming call when the handset is registered with the registration unit; and
   a call forwarding unit adapted to forward an incoming call to a forwarding number when the handset is not registered with the registration unit,
   wherein the forwarding number corresponds to another cordless telephone base unit if the handset is registered with the another cordless telephone base unit, and wherein the forwarding number corresponds to a cellular phone number associated with the handset if the handset is not registered with the another cordless telephone base unit.

2. A base unit as recited in claim 1, further comprising:
   a registration status indicator adapted to maintain an indication of registration status for the handset; and
   a status updating unit adapted to update the registration status indicator based on a change in registration status of the handset.

3. A base unit as recited in claim 2, wherein the registration unit is adapted to periodically determine the status of the handset.

4. A base unit as recited in claim 3, wherein the registration unit is adapted to determine the status of a handset by measuring a signal strength of a signal received from the handset.

5. A base unit as recited in claim 4, wherein the registration unit is adapted to poll the handset by instructing the handset to output a signal for use by the registration unit in measuring the signal strength.

6. A cordless telephone base unit, comprising:
   registration means for selectively registering with a handset according to at least one predefined criterion;
   call handling means for handling an incoming call when the handset is registered with the registration means; and
   call forwarding means for forwarding an incoming call to a forwarding number when the handset is not registered with the registration means,
   wherein the forwarding number corresponds to another cordless telephone base unit if the handset is registered with the another cordless telephone base unit, and wherein the forwarding number corresponds to a cellular phone number associated with the handset if the handset is not registered with the another cordless telephone base unit.

7. A base unit as recited in claim 6, further comprising:
   registration status indicating means for maintaining an indication of registration status for the handset; and
   status updating means for updating the registration status indicating means based on a change in registration status of the handset.

8. A base unit as recited in claim 7, wherein the registration means is adapted to periodically determine the status of the handset.

9. A base unit as recited in claim 8, wherein the registration means is adapted to determine the status of a handset by measuring a signal strength of a signal received from the handset.

10. A base unit as recited in claim 9, wherein the registration means is adapted to poll the handset by instructing the handset to output a signal for use by the registration unit in measuring the signal strength.

11. A base unit as recited in claim 10, further comprising means for providing registration status information to another cordless telephone base unit via a network.

12. A base unit as recited in claim 11, wherein the network is a public switched telephone network.

13. A base unit as recited in claim 11, wherein the network is a private network.

14. A cordless telephone, comprising:
    a handset; and
    a base unit, the base unit including
    a registration unit adapted to selectively register with a handset according to at least one predefined criterion;
    a call handling unit adapted to handle an incoming call when the handset is registered with the registration unit; and
    a call forwarding unit adapted to forward an incoming call to a forwarding number when the handset is not registered with the registration unit,
    wherein the forwarding number corresponds to another cordless telephone base unit if the handset is registered with the another cordless telephone base unit, and wherein the forwarding number corresponds to a cellular phone number associated with the handset if the handset is not registered with the another cordless telephone base unit.

15. A cordless telephone as recited in claim 14, wherein the base unit further includes
    a registration status indicator adapted to maintain an indication of registration status for the handset; and
    a status updating unit adapted to update the registration status indicator based on a change in registration status of the handset.

16. A cordless telephone as recited in claim 15, wherein the registration unit is adapted to periodically determine the status of the handset.

17. A cordless telephone as recited in claim 16, wherein the registration unit is adapted to determine the status of a handset by measuring a signal strength of a signal received from the handset.

18. A cordless telephone as recited in claim 17, wherein the registration unit is adapted to poll the handset by instructing the handset to output a signal for use by the registration unit in measuring the signal strength.

19. A cordless telephone as recited in claim 14, further comprising means for providing registration status information to another cordless telephone base unit via a network.

20. A cordless telephone as recited in claim 19, wherein the network is a public switched telephone network.

21. A cordless telephone as recited in claim 19, wherein the network is a private network.

22. A method of handling an incoming call in a cordless telephone base unit, comprising the steps of:
   determining if a handset is registered with the base unit;
   handling the incoming call in a normal manner if the handset is registered with the base unit; and
   forwarding the call to a forwarding number if the handset is not registered with the base unit,
   wherein the forwarding number corresponds to another cordless telephone base unit if the handset is registered with the another cordless telephone base unit, and
   wherein the forwarding number corresponds to a cellular phone number associated with the handset if the handset is not registered with the another cordless telephone base unit.

23. A method as recited in claim 22, further comprising the step of providing registration status information to another cordless telephone base unit via a network.

24. A method as recited in claim 23, wherein the network is a public switched telephone network.

25. A method as recited in claim 23, wherein the network is a private network.

26. A cordless telephone system, comprising:
   a plurality of cordless base units each at a respective location;
   a wired network coupling the cordless base units; and
   a handset adapted to communicate over the wired network to another party via one of the cordless base units,
   wherein the handset is adapted to be registered with only one of the cordless base units, and
   wherein the cordless base units are each adapted to inform the others cordless base units of a registration status via the wired network.

27. A cordless telephone system as recited in claim 26, wherein the wired network is a public switched telephone network.

28. A cordless telephone system as recited in claim 26, wherein the wired network is a private network.

29. A cordless telephone system as recited in claim 26, wherein the handset is further adapted to communicate over a cellular network if the handset is not registered with any of the cordless base units.

* * * * *